United States Patent
Kar et al.

(10) Patent No.: US 9,078,015 B2
(45) Date of Patent: *Jul. 7, 2015

(54) TRANSPORT OF PARTIALLY ENCRYPTED MEDIA

(71) Applicants: Motorola Mobility LLC, Libertyville, IL (US); Cable Television Laboratories, Inc., Louisville, CO (US)

(72) Inventors: Mukta L. Kar, Louisville, CO (US); Mandayam A. Narasimhan, San Diego, CA (US)

(73) Assignees: CABLE TELEVISION LABORATORIES, INC., Louisville, CO (US); GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/154,114

(22) Filed: Jan. 13, 2014

(65) Prior Publication Data

US 2014/0192982 A1    Jul. 10, 2014

Related U.S. Application Data

(63) Continuation of application No. 12/868,082, filed on Aug. 25, 2010, now Pat. No. 8,630,412.

(51) Int. Cl.
*H04L 29/06* (2006.01)
*H04N 21/2347* (2011.01)
(Continued)

(52) U.S. Cl.
CPC ... *H04N 21/23476* (2013.01); *H04N 21/23611* (2013.01); *H04N 21/23614* (2013.01); *H04N 21/2389* (2013.01); *H04N 21/23897* (2013.01); *H04N 21/6332* (2013.01); *H04N 21/8451* (2013.01)

(58) Field of Classification Search
CPC ............ H04N 7/1675; H04N 21/23476
USPC .......................................................... 380/200
See application file for complete search history.

(56) References Cited

U.S. PATENT DOCUMENTS

| 5,216,503 A | 6/1993 | Paik et al. |
| 5,473,326 A | 12/1995 | Harrington et al. |

(Continued)

FOREIGN PATENT DOCUMENTS

| EP | 1947680 | 7/2008 |
| WO | WO9611457 | 4/1996 |

(Continued)

OTHER PUBLICATIONS

International Search Report from corresponding PCT Application No. PCT/US2011/049074 dated Feb. 24, 2012 (14 pages total).

(Continued)

*Primary Examiner* — Michael S McNally
(74) *Attorney, Agent, or Firm* — Mayer & Williams, PC; Stuart H. Mayer (57) ABSTRACT

A method of facilitating transport of partially encrypted video is disclosed. The method re-packetizes or otherwise de-concatenates packets carrying the partially encrypted video into packets where all the video in each packet is either encrypted or unencrypted. The re-packetized video packets may include data that identifies whether the packet is carrying encrypted or unencrypted video.

25 Claims, 3 Drawing Sheets

(51) Int. Cl.
*H04N 21/236* (2011.01)
*H04N 21/2389* (2011.01)
*H04N 21/6332* (2011.01)
*H04N 21/845* (2011.01)

(56) References Cited

U.S. PATENT DOCUMENTS

| | | |
|---|---|---|
| 5,502,494 A | 3/1996 | Auld |
| 5,506,844 A | 4/1996 | Rao |
| 5,606,371 A | 2/1997 | Klein Gunnewiek et al. |
| 5,708,664 A | 1/1998 | Budge et al. |
| 5,805,220 A | 9/1998 | Keesman et al. |
| 5,910,827 A | 6/1999 | Kwan et al. |
| 5,963,256 A | 10/1999 | Tahara |
| 6,011,824 A | 1/2000 | Oikawa et al. |
| 6,038,256 A | 3/2000 | Linzer et al. |
| 6,047,255 A | 4/2000 | Williamson |
| 6,052,159 A | 4/2000 | Ishii et al. |
| 6,061,821 A | 5/2000 | Schlosser |
| 6,134,352 A | 10/2000 | Radha et al. |
| 6,151,362 A | 11/2000 | Wang |
| 6,163,335 A | 12/2000 | Barraclough |
| 6,167,084 A | 12/2000 | Wang et al. |
| 6,178,512 B1 | 1/2001 | Fifield |
| 6,208,759 B1 | 3/2001 | Wells |
| 6,243,417 B1 | 6/2001 | Obikane et al. |
| 6,253,249 B1 | 6/2001 | Belzile |
| 6,404,817 B1 | 6/2002 | Saha et al. |
| 6,421,387 B1 | 7/2002 | Rhee |
| 6,452,950 B1 | 9/2002 | Ohlsson et al. |
| 6,453,283 B1 | 9/2002 | Gigi |
| 6,493,388 B1 | 12/2002 | Wang |
| 6,510,219 B1 | 1/2003 | Wellard et al. |
| 6,512,795 B1 | 1/2003 | Zhang et al. |
| 6,590,902 B1 | 7/2003 | Suzuki et al. |
| 6,597,812 B1 | 7/2003 | Fallon et al. |
| 6,636,561 B1 | 10/2003 | Hudson |
| 6,665,317 B1 | 12/2003 | Scott |
| 6,683,889 B1 | 1/2004 | Shaffer et al. |
| 6,707,852 B1 | 3/2004 | Wang |
| 6,721,327 B1 | 4/2004 | Ekudden et al. |
| 6,747,999 B1 | 6/2004 | Grosberg et al. |
| 6,778,553 B1 | 8/2004 | Chou |
| 6,792,047 B1 | 9/2004 | Bixby et al. |
| 6,859,460 B1 | 2/2005 | Chen |
| 6,885,986 B1 | 4/2005 | Gigi |
| 6,934,258 B1 | 8/2005 | Smith et al. |
| 6,996,059 B1 | 2/2006 | Tonogai |
| 7,003,039 B2 | 2/2006 | Zakhor et al. |
| 7,068,710 B2 | 6/2006 | Lobo et al. |
| 7,092,441 B1 | 8/2006 | Hui et al. |
| 7,096,481 B1 | 8/2006 | Forecast et al. |
| 7,180,901 B2 | 2/2007 | Chang et al. |
| 7,271,747 B2 | 9/2007 | Baraniuk et al. |
| 7,295,137 B2 | 11/2007 | Liu et al. |
| 7,359,324 B1 | 4/2008 | Ouellette et al. |
| 7,406,501 B2 | 7/2008 | Szeto et al. |
| 7,502,818 B2 | 3/2009 | Kohno et al. |
| 7,504,969 B2 | 3/2009 | Patterson et al. |
| 7,653,867 B2 | 1/2010 | Stankovic et al. |
| 7,660,245 B1 | 2/2010 | Luby |
| 7,733,893 B2 | 6/2010 | Lundin |
| 7,818,779 B2 | 10/2010 | Matsuzaki et al. |
| 7,886,071 B2 | 2/2011 | Tomita |
| RE42,272 E | 4/2011 | Zakhor et al. |
| 8,050,446 B2 | 11/2011 | Kountchev et al. |
| 8,139,642 B2 | 3/2012 | Vilei et al. |
| 8,145,975 B2 | 3/2012 | Lin et al. |
| 8,243,921 B1 | 8/2012 | Ryal |
| 8,326,061 B2 | 12/2012 | Massimino |
| 8,352,737 B2 | 1/2013 | Solis et al. |
| 8,477,050 B1 | 7/2013 | Massimino |
| 8,527,846 B2 | 9/2013 | Kure |
| 8,630,412 B2 | 1/2014 | Kar et al. |
| 8,687,654 B1 | 4/2014 | Lundin |
| 8,836,547 B1 | 9/2014 | He et al. |
| 8,907,821 B1 | 12/2014 | Massimino |
| 2002/0034245 A1 | 3/2002 | Sethuraman et al. |
| 2002/0140851 A1 | 10/2002 | Laksono |
| 2002/0159525 A1 | 10/2002 | Jeong |
| 2002/0167911 A1 | 11/2002 | Hickey |
| 2003/0018647 A1 | 1/2003 | Bialkowski |
| 2003/0058943 A1 | 3/2003 | Zakhor et al. |
| 2003/0103681 A1 | 6/2003 | Guleryuz |
| 2003/0169368 A1 | 9/2003 | Hamada et al. |
| 2004/0064688 A1 | 4/2004 | Jacobs |
| 2004/0146113 A1 | 7/2004 | Valente |
| 2004/0196975 A1 | 10/2004 | Zhu et al. |
| 2005/0063402 A1 | 3/2005 | Rosengard et al. |
| 2005/0069132 A1 | 3/2005 | Sakai |
| 2005/0111557 A1 | 5/2005 | Kong et al. |
| 2005/0157714 A1 | 7/2005 | Shlissel et al. |
| 2005/0220444 A1 | 10/2005 | Ohkita et al. |
| 2005/0232290 A1 | 10/2005 | Mathew et al. |
| 2005/0259690 A1 | 11/2005 | Garudadri et al. |
| 2005/0281204 A1 | 12/2005 | Karol et al. |
| 2006/0050880 A1* | 3/2006 | Taylor et al. .................. 380/203 |
| 2006/0062481 A1 | 3/2006 | Suvanto |
| 2006/0200733 A1 | 9/2006 | Stankovic et al. |
| 2006/0209709 A1 | 9/2006 | Kovacevic |
| 2006/0256232 A1 | 11/2006 | Noguchi |
| 2006/0285598 A1 | 12/2006 | Tulkki |
| 2007/0006253 A1 | 1/2007 | Pinder et al. |
| 2007/0041716 A1 | 2/2007 | Van Gestel |
| 2007/0162981 A1 | 7/2007 | Morioka et al. |
| 2007/0189164 A1 | 8/2007 | Smith et al. |
| 2007/0230585 A1 | 10/2007 | Kim et al. |
| 2007/0233707 A1 | 10/2007 | Osmond et al. |
| 2007/0255758 A1 | 11/2007 | Zheng et al. |
| 2007/0268979 A1 | 11/2007 | Chang et al. |
| 2007/0291942 A1 | 12/2007 | Candelore et al. |
| 2008/0005201 A1 | 1/2008 | Ting et al. |
| 2008/0008239 A1 | 1/2008 | Song |
| 2008/0046249 A1 | 2/2008 | Thyssen et al. |
| 2008/0052630 A1 | 2/2008 | Rosenbaum et al. |
| 2008/0065633 A1 | 3/2008 | Luo et al. |
| 2008/0130756 A1 | 6/2008 | Sekiguchi et al. |
| 2008/0137847 A1* | 6/2008 | Candelore et al. ............ 380/200 |
| 2008/0170793 A1 | 7/2008 | Yamada et al. |
| 2008/0225735 A1 | 9/2008 | Qiu et al. |
| 2008/0291842 A1 | 11/2008 | Isambart et al. |
| 2009/0052543 A1 | 2/2009 | Wu et al. |
| 2009/0103606 A1 | 4/2009 | Lu et al. |
| 2009/0110055 A1 | 4/2009 | Suneya |
| 2009/0135849 A1 | 5/2009 | Alkove et al. |
| 2009/0168644 A1 | 7/2009 | Zimmet et al. |
| 2009/0213940 A1 | 8/2009 | Steinbach et al. |
| 2009/0219994 A1 | 9/2009 | Tu et al. |
| 2009/0225983 A1 | 9/2009 | Reinoso et al. |
| 2009/0271814 A1 | 10/2009 | Bosscha |
| 2009/0271832 A1 | 10/2009 | Park et al. |
| 2009/0284650 A1 | 11/2009 | Yu et al. |
| 2010/0104006 A1 | 4/2010 | Taylor et al. |
| 2010/0123607 A1 | 5/2010 | He et al. |
| 2010/0188273 A1 | 7/2010 | He et al. |
| 2010/0189254 A1 | 7/2010 | Candelore et al. |
| 2011/0069237 A1 | 3/2011 | Wang et al. |
| 2012/0008681 A1 | 1/2012 | Lundin |

FOREIGN PATENT DOCUMENTS

| | | |
|---|---|---|
| WO | WO9747128 | 12/1997 |
| WO | 02/15579 | 2/2002 |
| WO | WO0233979 | 4/2002 |
| WO | WO02062072 | 8/2002 |
| WO | WO02067590 | 8/2002 |
| WO | WO02078327 | 10/2002 |
| WO | WO03043342 | 5/2003 |
| WO | 2010/000692 | 1/2010 |

OTHER PUBLICATIONS

Bagni, D.—A constant quality single pass vbr control for dvd recorders, IEEE, 2003, pp. 653-662.

(56) References Cited

OTHER PUBLICATIONS

Balachandran, et al., Sequence of Hashes Compression in Data Deduplication, Data Compression Conference, Mar. 2008, p. 505, issue 25-27, United States.

Cui, et al., Opportunistic Source Coding for Data Gathering in Wireless Sensor Networks, IEEE Int'l Conf. Mobile Ad Hoc & Sensor Systems, Oct. 2007, http://caltechcstr.library.caltech.edu/569/01 HoCuiCodingWirelessSensorNetworks.pdf, United States.

David Slepian and Jack K. Wolf, Noiseless Coding of Correlated Information Sources, IEEE Transactions on Information Theory; Jul. 1973; pp. 471-480; vol. 19, United States.

Extended European Search Report EP09171120, dated Aug. 2, 2010.

Feng, Wu-chi; Rexford, Jennifer; "A Comparison of Bandwidth Smoothing Techniques for the Transmission of Prerecorded Compressed Video", Paper, 1992, 22 pages.

Fukunaga, S. (ed.) et al., MPEG-4 Video Verification Model VM16, International Organisation for Standardisation ISO/IEC JTC1/SC29/WG11 N3312 Coding of Moving Pictures and Audio, Mar. 2000.

Ghanbari Mohammad, "Postprocessing of Late Calls for Packet Video", IEEE Transactions on Circuits and Systems for Video Technology, vol. 6, No. 6, Dec. 1996, 10 pages.

Gustafsson, F., Adaptive Filtering and Change Detection, John Wile & Sons, LTd, 2000.

He, Z. et al., A Linear Source Model and a Unified Rate Control Algorithm for DCT Video Coding, IEEE Transactions on Circuits and Systems for Video Technology, Nov. 22, 2000.

ISR and Written Opinion (date of mailing: Oct. 15, 2012; PCT/US2012/040177, filed May 31, 2012.

Keesman, G.—Bit-rate control for Mpeg encoders, Signal Processing Image communication 6 (1995) 545-560.

Laoutaris, Nikolaos, et al; "Intrastream Synchronization for Continuous Media Streams: A Survey of Playout Schedulers", IEEE Network, IEEE Service Center, vol. 16, No. 3 (May 1, 2002) pp. 30-40.

Liang, Yi J., et al; "Adaptive Playout Scheduling Using Time-Scale Modification in Packet Voice Communications", 2001 IEEE International Conference on Acoustics, Speech, and Signal Processing, vol. 3 (May 7, 2001), pp. 1445-1448.

Liu, Haining, et al; "On the Adaptive Delay and Synchronization Control of Video Conferencing over the Internet", International Conference on Networking (ICN) (2004) 8 pp.

Liu, Hang, et al; "Delay and Synchronization Control Middleware to Support Real-Time Multimedia Services over Wireless PCS Networks", IEEE Journal on Selected Areas in Communications, IEEE Service Center, vol. 17, No. 9 (Sep. 1, 1999) pp. 1660-1672.

Nethercote, Nicholas, et al,; "How to Shadow Every Byte of Memory Used by a Program", Proceedings of the 3rd International Conference on Virtual Execution Environments, Jun. 13-15, 2007 San Diego CA, pp. 65-74.

Page, E. S., "Continuous Inspection Schemes"; Biometrika 4I; Statistical Laboratory, University of Cambridge, (1954); pp. 100-115.

"Rosenberg, J. D. RTCWEB I-D with thoughts on the framework. Feb. 8, 2011. Retrieved fromhttp://www.ietf.org/mail-archive/web/dispatch/current/msg03383.html on Aug. 1, 2011."

Schulzrinne, H., et al. RTP: A Transport Protocol for Real-Time Applications, RFC 3550. The Internet Society. Jul. 2003.

Sekiguchi S. et al.: "CE5: Results of Core Experiment on 4:4:4 Coding", JVT Meeting: Mar. 31, 2006-Apr. 7, 2006 Geneva, CH; (Joint Videoteam of ISO/IEC JTC1/SC29/WG11 and ITU-T Sg. 16), No. JVT-S014, Apr. 1, 2006 pp. 1-19.

Woo-Shik Kim et al: "Enhancements to RGB coding in H.2641MPEG-4 AVC. FRExt", Internet Citation, Apr. 16, 2005, XP002439981, Retrieved from the internet: URL:ftp3.itu.ch/av-arch/video-site/0504_Bus/VCEG-Z16.doc, retrieved on Jun. 28, 2007 p. 5.

Sunil Kumar Liyang Xu, Mrinal K. Mandal, and Sethuraman Panchanathan, Error Resiliency Schemes in H.264/AVC Standard, Elsevier J. of Visual Communication & Image Representation (Special issue on Emerging H.264/AVC Video Coding Standard), vol. 17 (2), Apr. 2006.

Tekalp, Murat A,: Digital Video Processing, Prentice Hall Signal Processing Series, Chapter 6: Block Based Methods. vol. 103-646, pp. 95-117. Aug. 1995.

Wang, Yao "Error Control and Concealment for Video Communication: A Review", Proceedings of the IEEE, vol. 86, No. 5, May 1998, 24 page.

Trista Pei-Chun Chen and Tsuhan Chen, Second-Generation Error Concealment for Video Transport Over Error Prone Channels, electrical computer Engineering, Carnegie Mellon University, Pittsburgh, PA 15213, U.S.A., Proceedings of the 2002 International Conference on Image Processing, vol. 1, pp. 1-25-1-28 (IEEE 2002).

Tsai, et al., The Efficiency and Delay of Distributed Source Coding in Random Access Sensor Networks, 8th IEEE Wireless Communications and Networking Conference, Mar. 2007, pp. 786-791, United States.

Vasudev Bhaskaran et al., "Chapter 6: The MPEG Video Standards", Image and Video Compression Standards—Algorithms & Architectures, Second Edition, 1997, pp. 149-230 Kluwer Academic Publishers.

Wang, et al., Distributed Data Aggregation using Clustered Slepian-Wolf Coding in Wireless Sensor Networks, IEEE International Conference on Communications, Jun. 2007, pp. 3616-3622, United States.

* cited by examiner

TRANSPORT OF PARTIALLY ENCRYPTED MEDIA

CROSS REFERENCE TO RELATED APPLICATIONS

This application is a continuation of U.S. patent application Ser. No. 12/868,082, filed Aug. 25, 2010, entitled "TRANSPORT OF PARTIALLY ENCRYPTED MEDIA", now U.S. Pat. No. 8,630,412, issued Mar. 1, 2012, which is incorporated herein by reference in its entirety.

TECHNICAL FIELD

The present invention relates to methods and systems of facilitating playback and transport of partially encrypted media, such as, but not limited video partially encrypted according to advance video coding (AVC).

BACKGROUND

Protection of digital media has become very important to content owners as a copy of a digital media is the same as its original in every aspect. At present, television content is encrypted at the source of origin, and thereafter is decrypted and re-encrypted one or more times on its way from source of origin (studio) to the end-user. In some cases, the studio's distribution system may be different from an encryption system used in a delivery network of a service provider. As a result, for example with respect to television, most television content is decrypted, goes through minimal processing, and then is re-encrypted before delivery to subscriber user devices.

The process of decryption and re-encryption at the service providers' end or at any other point in distribution/delivery chain, other than the end-user's device, is a concern for the owner of the content as it becomes vulnerable to illegal copying and distribution in the consumer market place by rogue businesses. However, if the content can be encrypted only once at the source of origin and decrypted only at the end-user devices, and no decryption and re-encryption takes place in the middle of distribution/delivery network, the process may alleviate content owner concerns with the distribution/delivery chain. In addition, the process may also save some cost associated with decryption and re-encryption equipment used at the service provider's facilities.

To alleviate the need for decryption at any point in the distribution/delivery chain other than at the end-user device, storage and distribution of partially encrypted advanced video coding (AVC) video access units have been proposed in Microsoft's Protected Interoperable File Format (PIFF). It may be necessary to store and distribute partially encrypted video as opposed to encryption of entire video access unit or all bytes of slice NAL units, such as to adapt the video content to various video applications, particularly broadcast applications, where some information about video characteristics may be necessary at the service provider's plant before being delivered to consumers.

In the case of AVC video, this information may be available at a beginning of each packet within bytes (from a few bytes to 100 bytes) of the video access unit including the slice header. The bytes at the start of a video access unit may be kept in a clear (unencrypted) state while some or all of the rest of the slice may be encrypted. The small number of clear bytes at the start of an access unit may not be sufficient for an AVC decoder to identify the portions of the packet that are encrypted and the portions that are not. This may make it difficult for the decoder to decode the entire compressed slice and generate a continuous video experience. By keeping the video slices partially encrypted, it ensures that at no point in the delivery chain do the media need decryption and re-encryption. The decryption only happens at the consumer's devices.

To deal with partially encrypted slices, additional information related to how many bytes are in clear in each slice or the location of starting bytes of the encrypted part of the slice has to be available to the decoder. This information related to the starting point of encryption for each slice can be sent in-band or out of band (OOB). The delivery of such information to the decryption system adds some complexity. In addition, the decryption system needs additional resources to process this extra information and perform decryption.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Figure 1:
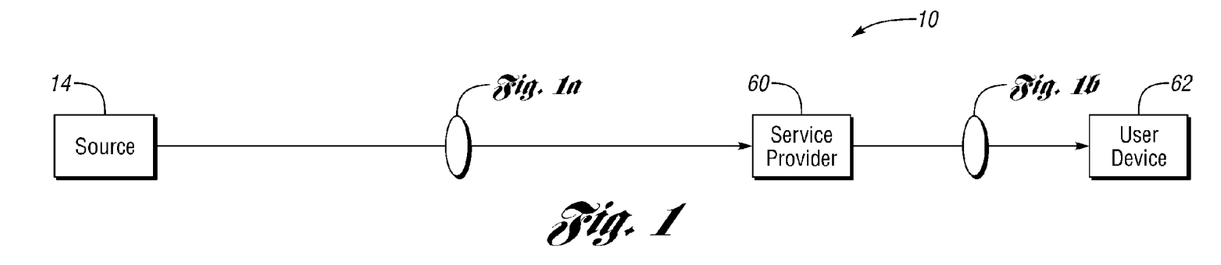
FIGS. 1, 1a and 1b illustrates a system for supporting transport of partially encrypted media in accordance with one non-limiting aspect of the present invention.
Figure 1A:
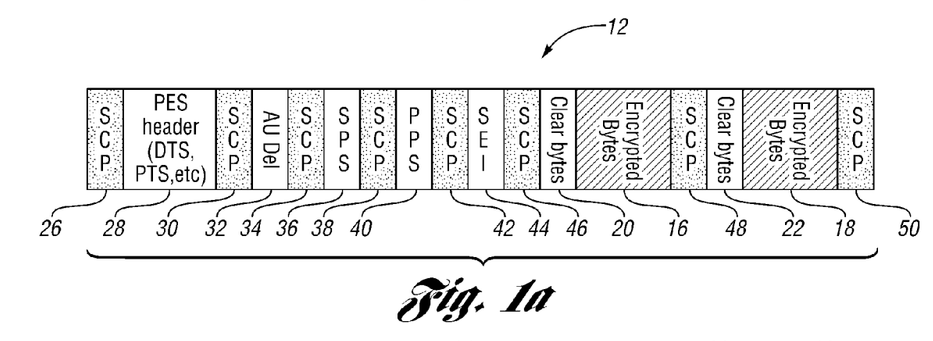
Figure 1B:
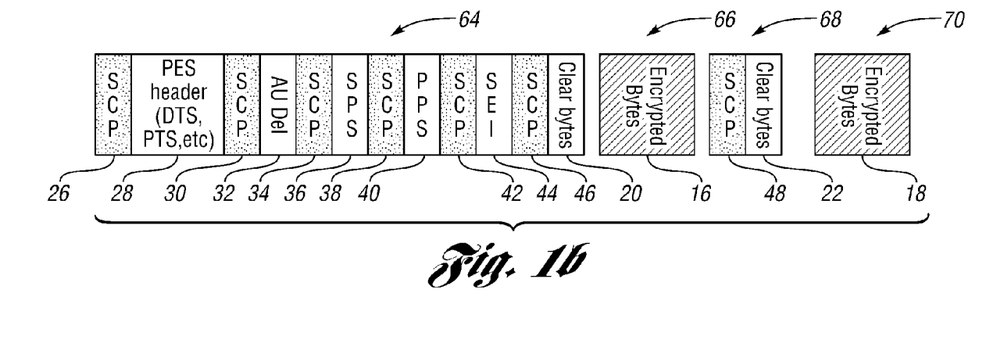

FIG. 1 illustrates a system 10 for supporting transport of partially encrypted media in accordance with one non-limiting aspect of the present invention. The system 10 is shown and described for exemplary purposes to support transport of video within partially encrypted advanced video coding (AVC) access units (AUs) that are encapsulated into a plurality of packetized elementary stream (PES) packets for transport within one or more transport stream (TS) packets 12. This, however, is done for exemplary purposes only and without intending to unnecessarily limit the scope and contemplation of the present invention as the present invention fully contemplates its use in supporting transport of any type of partially encrypted media.

The partially encrypted media shown within the illustrated packet 12 represents video transmitted from a source 14. While the packet is used to represent video, the present invention fully contemplates the packet 12, or a similar partially encrypted packet, being used to transport other types of data and media. The packet 12 may be characterized as a partially encrypted packet since it includes encrypted video slices 16, 18 and unencrypted, or clear, video slices 20, 22. A number of data slices 26, 28, 30, 32, 34, 36, 38, 40, 42, 44, 46, 48, 50 may be sandwiched around the sequence of video slices 16, 18, 20, 22 depending on a transport protocol used to support transmission of the packet 12, which for an exemplary and non-limiting aspect of the present invention is shown to be formatted according to MPEG.

While only packet 12 is shown, a number of packets 12 may be streamed or otherwise transported from the source 14 to support video/media playback in the event a run time of the video is greater than that which can be carried within one partially encrypted packet 12. In some cases, a length of each transmitted packet 12, which may be as measured as its total number of bytes, may be adjusted or otherwise adapted depending on image resolution, content conveyed within the image, and/or operating requirements of a device being used to facilitate playback. Optionally, other information and parameters, such as executing code (e.g., code/data used to support Enhanced TV Binary Interchange Format (EBIF) related applications and functions) may be included.

A service provider 60 or third party entity may be positioned downstream of the source 14 in accordance with one non-limiting aspect of the present invention to process or otherwise re-packetize the partially encrypted packet 12 prior to receipt by a user device 62 associated with a subscriber. The service provider 60 may be a multiple system operator (MSO) or other entity that provides electronic data dependent services to a plurality of user devices. The service provider 60 may include a computer, slicer, server, headend unit, mobile phone transceiver, or other element (not shown) having capabilities sufficient to manipulate the partially encrypted packet 12 into a greater number of fully encrypted and fully unencrypted packets 64, 66, 68, 70 as contemplated by one non-limiting aspect of the present invention.

The packets 64, 66, 68, 70 created by the service provider 60 may be comprised solely of encrypted video slices 16, 18 or unencrypted video slices 20, 22, referred to herein as fully encrypted packets 66, 70 and fully unencrypted packets 64, 68. The new, encrypted and unencrypted packets 64, 66, 68, 70 may be generated by re-packetizing or de-concatenating the packet 12 along boundaries defined relative to each of the encrypted and unencrypted video slices 16, 18, 20, 22 such that at least one new packet 64, 66, 68, 70 may be created to carry each video slice 16, 18, 20, 22 included within the partially encrypted packet 12.

Optionally, multiple packets may be created for the same video slice if a length of the video slice exceeds a threshold length or other desired length/size of the newly created packets 64, 66, 68, 70. The illustrated packet 12 is shown to be re-packetized into four packets 64, 66, 68, 70—one for each of the video slices 16, 18, 20, 22. The new packets 64, 66, 68, 70 may be, but need not necessarily be, created without the service provider 60 having to decrypt the encrypted video slices 16, 18. This may be facilitated by segmenting the packet 12 along boundaries defined by the encrypted and unencrypted video slices 16, 18, 20, 22, i.e., along boundaries defined to as occurring between data slices 46, 48, 50 adjoining video slices 16, 18, 20, 22 and successive video slices 16, 18, 20, 22.

These boundaries may be automatically detected by the slicer to facilitate an automated process for generating the new packets 64, 66, 68, 70. The slicer may be operable to read contents of each data slice 26, 28, 30, 32, 34, 36, 38, 40, 42, 44, 46, 48, 50 and video slice 16, 18, 20, 22 and to determine appropriate boundaries based on the information included therein. Optionally, the slicer may be configured to create at least one new packet for each video slice. While new packets 64, 66, 68, 70 may be generated for each video slice, all of the data slices 26, 28, 30, 32, 34, 36, 38, 40, 42, 44, 46, 48, 50 need not necessarily be included in the any one or more of the new packets 64, 66, 68, 70. As shown, some of the data slices 26, 28, 30, 32, 34, 36, 38, 40, 42, 44, 46, 48, 50 may be excluded from the re-packetized packets depending on the nature of the information included therein.

An automated process can be helpful in managing the time taken to re-packetize the partially encrypted packet 12, including the optional ability to support generation of more or less new packets depending on network congestion levels. Additional features may be added during the re-packetization process, such as to insert graphical ads and other content that would appear during playback of the new packets 64, 66, 68, 70. The new packets 64, 66, 68, 70 may be transmitted in a sequence that matches their order within the packet 12. Timestamps and other data slices/headers (not shown) may be added to each of the new packets 64, 66, 68, 70 to support transmission and organization relative to the sequence defined prior to re-packetization by the partially encrypted packet 12.

The illustrated partially encrypted packet 12 includes four separate video portions (two encrypted and two unencrypted) 16, 18, 20, 22, which may be referred to as a V number of video slices. The V number of video slices 16, 18, 20, 22 may be re-packetized in to P number of the new packets 64, 66, 68, 70. The exemplary illustration provided herein re-packetizes the V number of video slices into the same P number of packets 64, 66, 68, 70, i.e., V=P=4, although the present invention is not intended to be limited to this type of one-to-one conversion. The new packets 64, 66, 68, 70 are shown to be of varying length L as measured by the number of bytes comprising each packet 64, 66, 68, 70 (the larger packets are illustrates to have a larger horizontal length). The use of varying length packets 64, 66, 68, 70 may be helpful in limiting the number of bytes comprising each of the new packets 64, 66, 68, 70.

Figure 2:
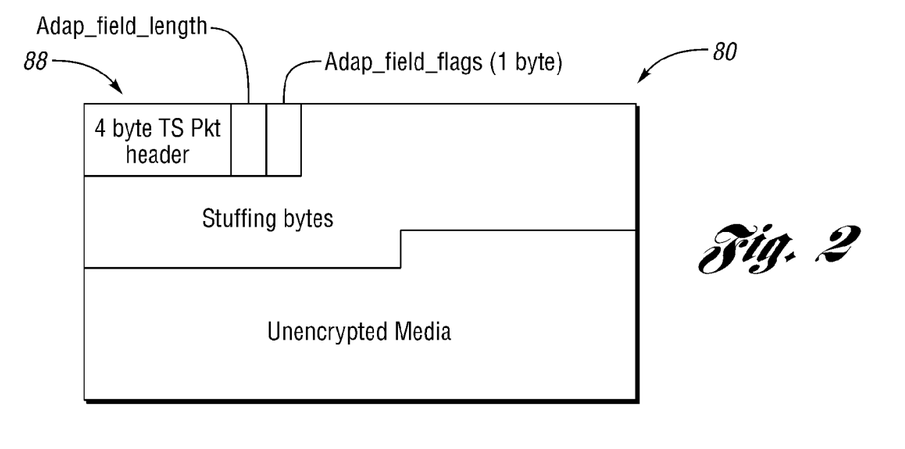
FIGS. 2-4 illustrate fixed-length packets generated in according with non-limiting aspects of the present invention.
Figure 3:
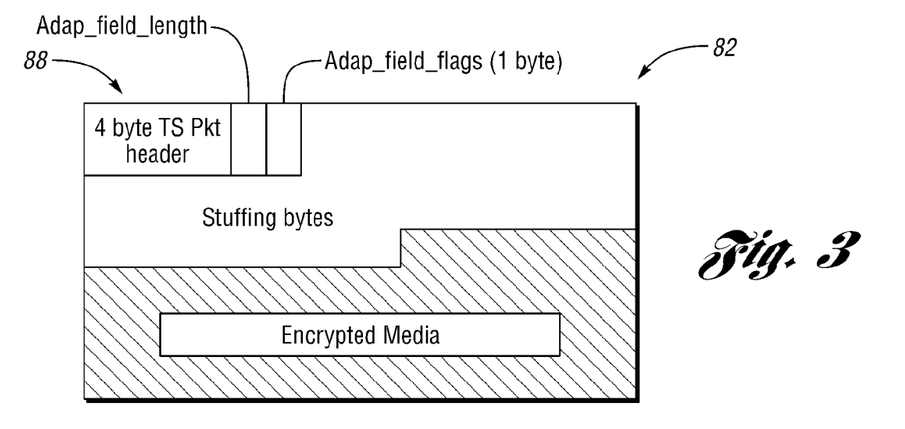
Figure 4:
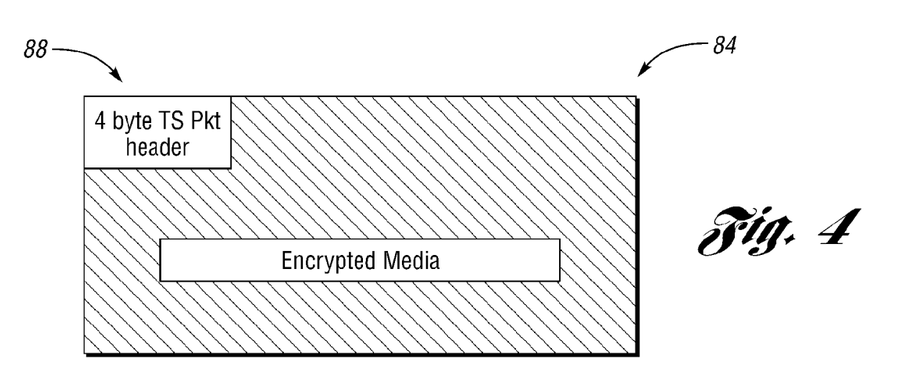

Optionally, instead of generating new packets 64, 66, 68, 70 at variable lengths, one non-limiting aspect of the present invention contemplates generating the new packets 64, 66, 68, 70 to include the same total X number of bytes. FIGS. 2-4 illustrate fixed-length packets 80, 82, 84 that can be generated in according with non-limiting aspects of the present invention. FIGS. 2 and 3 respectively illustrate fully unencrypted and encrypted data packets 80, 82 where an S number of stuffing bytes have been added as part of re-packetizing process to each of the packets 80, 82. The stuffing bytes may be data bytes and/or other non-video bytes.

The S number of bytes added to each packet may be individually selected depending on the size of the video slice included therein or other data slices that may be included therein. (Only video slices are shown in FIGS. 2 and 3 for exemplary purposes. The additional data slices and/or other non-illustrated pieces of data may be included with a corresponding addition of stuffing bytes.) The amount of stuffing bytes added to each packet 80, 82 may be tailored such that each of the new packets 80, 82 has the same X number of total bytes. For example, if the same X number of bytes is desired for each packet 80, 82, the S number of stuffing bytes added to each new packet may be based on the particular L value of each packet 80, 82 such that $S=X-L$.

FIG. 4 illustrates a scenario where the video slice (not shown) from which the illustrated packet 84 was generated had a length L which was equal to or greater than X number of bytes desired for the illustrated packet 84, i.e., where $L>X$ such that no stuffing bytes are required for the illustrated first one of the two packets. The second one of the packets (not shown) may require stuffing bytes in an amount equal to the remaining number of video bytes relative to desired X number of total bytes, i.e., $S=X-L$ where L equal the remaining number of video bytes, such that it would have a configuration similar to FIG. 2 or 3. The process of re-packetizing a single video slice into multiple packets can result in any number of packets being generated from a single video slice depending on the length of the video slice and the X threshold of total bytes per packet.

To facilitate the transmission and processing of the packets 80, 82, 84, a number of clear, unencrypted bytes may be included at a beginning of each packet 80, 82, 84 to transport data that can be used to identify whether the packet 80, 82, 84 includes encrypted or unencrypted video, the number and positioning of any stuffing bytes, and the number and positioning of any encrypted and unencrypted video bytes. In accordance with one non-limiting aspect of the present invention this data may be added to each packet 80, 82, 84 according the MPEG protocols by setting the necessary flags within a four byte packet header, and if necessary, within an adaptation field length and an adaptation field flag.

In the event the packet 80, 82, 84 includes encrypted media, the information included in the four byte header may identify digital rights and descrambling parameters needed to decode the encrypted video. The adaptation field length may be used to specify the location and/or the length of the stuffing bytes and omitted when stuffing bytes are not included. The adaptation field flag may be used to indicate timestamps, whether the video slices are I, B, or P frames, etc. Optionally, the adaptation field length and flag may occupy no more than one byte such that the stuffing bytes would have to added thereafter in the event additional bytes would be needed to properly size the packet.

Figure 5:
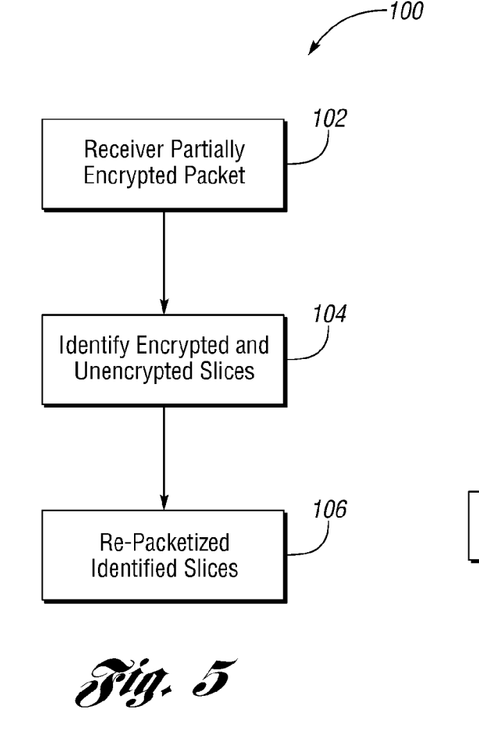
FIG. 5 illustrates a flowchart of a method for processing partially encrypted media packets in accordance with one non-limiting aspect of the present invention.

FIG. 5 illustrates a flowchart 100 of a method for processing partially encrypted media packets in accordance with one non-limiting aspect of the present invention. The method is predominately described with respect to processing partially encrypted video packets of the type having encrypted video slices and unencrypted video slices. The description is provided for exemplary purposes and without intending to limited the scope and contemplation of the present invention to the re-packetization of video packets as the present invention may be suitable for use with other processing schemes where it may be advantageous to support the transmission of partially encrypted data packets.

Block 102 relates to receiving a partially encrypted video packet. The received packet may be considered as partially encrypted as long as it includes at least one unencrypted video slice and one encrypted video slice. The partially encrypted video packet may be received by a computer or other logically executing element having capabilities sufficient to support execution of some or all of the functions and process as necessary to implementing the operations contemplated by the present invention. Such a device may receive the partially encrypted video packet through wireless or wireline communication, such as over a cable, mobile phone, or satellite service network, and/or from a disc or other storage element.

Block 104 relates to identifying each of the one or more encrypted and unencrypted video slices, such as from data or other information included in a header or other portion of the partially encrypted video packet. Optionally, in the event the partially encrypted video packet fails to include information sufficient for the computer or other device receiving the partially encrypted video packet to self-identify the encrypted and unencrypted video slices, a server or other element may be relied upon to identify the video slices, such as through a look-up table or other cross-reference tool where a packet identifier of the partially encrypted video packet may be used to look-up or otherwise identifying the location of each video slice.

Block 106 relates to separating or otherwise de-concatenating each of the identified video slices into separate and independent video packets comprised wholly of encrypted or unencrypted video slices. This process may be characterized as a re-packetization process in that some or all of the video, data or other information in the partially encrypted video segment may be segmented or otherwise partitioned into a greater number of new packets, such as in the manner described above with respect to adding identifying information, and in some cases, stuffing bytes to the new packets. The process may be automated, such as to support playback of video where a plurality of partially encrypted video packets in the event the plurality of video packets are required to view the entire video.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
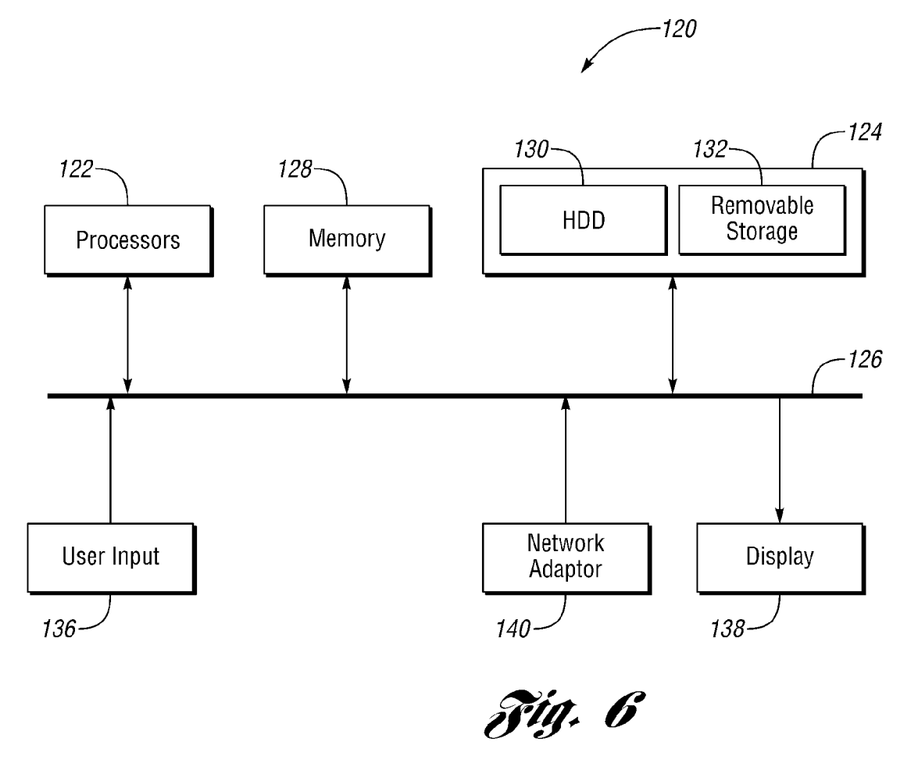
FIG. 6 illustrates a block diagram of a computing apparatus in accordance with one non-limiting aspect of the present invention.

FIG. 6 illustrates a block diagram of a computing apparatus 120 configured to implement re-packetization of partially encrypted media packets in accordance with one non-limiting aspect of the present invention. It should be understood that the illustration of the computing apparatus 120 is a generalized illustration and that the computing apparatus 120 may include additional components and that some of the components described may be removed and/or modified without departing from a scope of the computing apparatus 120.

The computing apparatus 120 includes a main processor/controller 122 that may implement or execute some or all of the steps, functions, operations, and/or process described above. For example, the processor 122 may be configured to implement one or more programs stored in a memory 124 to classify feature vectors as described above.

Commands and data from the processor 122 are communicated over a communication bus 126. The computing apparatus 120 also includes a memory 128, such as a random access memory (RAM), where the program code for the processor 122 may be executed during runtime, and the memory 124. The memory 124 includes, for example, one or more hard disk drives 130 and/or a removable storage drive 132, representing a floppy diskette drive, a magnetic tape drive, a compact disk drive, etc.

User input 136 devices may include a keyboard, a mouse, and a touch screen display. A display 138 may receive display data from the processor 122 and convert the display data into display commands for the display 138. In addition, the processor(s) 122 may communicate over a network, for instance, the Internet, LAN, etc., through a network adaptor 140. The network adapter 140 may be operable to de-concatenate the encrypted and unencrypted video slices received within partially encrypted video packets. The processor 122 may instruct the network adaptor 140 to transmit the de-concatenated video slices in separate video packets, such as according to the process described above.

As supported above, one non-limiting aspect of the present invention relates a method of transporting partially encrypted AVC video slices using signaling resources of the MPEG-2 transport protocol. This may included identifying how many bytes are in clear or the location of starting byte of the encrypted part of the slice using MPEG-2 transport protocols and signaling. A PES packet containing an AVC video Access Unit which is randomly accessible in that it may include SPS NAL, PPS NAL, SEI NAL (optional) and two intra-coded slices.

One non-limiting aspect of the present invention presumes the cost to generate and transport the fully encrypted and fully unencrypted packets to be justified relative the costs associated with replacing or reconfiguring user devices or other devices to support decode of the partially encrypted packets.

One non-limiting aspect of the present contemplates delivering partially encrypted AVC video slices that are fully backward compatible with MPEG-2 transport compliant AVC set-top boxes/receivers and may not require any additional resources. The mapping contemplated by the present invention may add overhead to the transmitted data. The present invention is contemplated to be at least used for other video compression systems such as MPEG-2 video, VC-1 and MPEG-4 part 2 video that may use this type of partial encryption technique proposed in PIFF.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

What is claimed is:

1. A computer-readable medium not including a signal and having stored thereon computer-executable instructions which when executed by a computer perform a method for re-packetizing partially encrypted video packets, the method comprising:
    identifying at least one encrypted video slice and at least one unencrypted video slice within each partially encrypted video packet, each of the partially encrypted video packets including both encrypted video slices and unencrypted video slices;
    de-concatenating each of the at least one encrypted video slice and the at least one unencrypted video slice into separate packets; and
    generating at least one fully unencrypted video packet for each of the unencrypted video slices and at least one fully encrypted video packet for each of the encrypted video slices.

2. The computer-readable medium of claim 1 further comprising transmitting the fully encrypted and unencrypted video packets within a transport stream.

3. The computer-readable medium of claim 2 further comprising transmitting the fully encrypted and unencrypted video packets in a sequential order matching a sequential order in which respective video slices contained therein are arranged in the partially encrypted video packets.

4. The computer-readable medium of claim 2 wherein the transport stream is an MPEG transport stream.

5. The computer-readable medium of claim 1 further comprising identifying whether decryption is needed to playback the separate packets with data included a beginning of each of the separate packets.

6. The computer-readable medium of claim 1 wherein generating at least one fully encrypted video packet includes generating the at least one fully encrypted video packet without decrypting the encrypted video slice.

7. The computer-readable medium of claim 1 wherein de-concatenating includes de-concatenating each of the at least one encrypted video slice and the at least one unencrypted video slice by identifying boundaries between each of the encrypted and unencrypted video slices and adjoining data slices.

8. The computer-readable medium of claim 1 wherein generating at least one fully unencrypted video packet for each of the unencrypted video slices includes generating plurality of fully unencrypted video packet for each of the unencrypted video slices.

9. The computer-readable medium of claim 1 further comprising inserting additional content into the at least one fully encrypted video packet and/or the at least one fully unencrypted video packet.

10. The computer-readable medium of claim 1 further comprising adding stuffing bytes to one or more of the separate packets such that each of the separate packets includes the same total number of bytes.

11. The computer-readable medium of claim 10 further comprising adding the stuffing bytes such that a header, an adaptation field, and an adaptation field flag of each of the separate packets has the same total number of bytes and without decrypting the at least one encrypted video slice.

12. A method of re-packetizing partially encrypted media packets, the method comprising:
    identifying media slices included within the plurality of partially encrypted packets as encrypted media slices and unencrypted media slices, each of the plurality of partially encrypted packets including both encrypted media slices and unencrypted media slices; and
    re-packetizing the plurality of partially encrypted packets into a number of re-packetized packets without decrypting the encrypted media slices, each re-packetized packet having one but not both of encrypted media slices and unencrypted media slices.

13. The method of claim 12 further comprising re-packetizing the plurality of packets such that the number of re-packetized packets is at least equal to the number of unencrypted and encrypted media slices.

14. The method of claim 12 wherein the number of the plurality of packets is equal to P number and the plurality of packets include a total X number of unencrypted and encrypted media slices, and the method further comprises re-packetizing the P number of packets into at least P*X number of re-packetized packets.

15. The method of claim 12 further comprising re-packetizing the plurality of packets such that each re-packetized packet includes the same total number of bytes.

16. The method of claim 15 further comprising adding stuffing bytes to one or more of the re-packetized packets such that each of the re-packetized packets has the same total number of bytes.

17. The method of claim 16 further comprising adding the stuffing bytes without including an adaptation field flag and an adaptation field length of more than one byte each.

18. The method of claim 12 further comprising setting flags within headers of each of the re-packetized packets that identify whether the media slices within that packet are encrypted or unencrypted media slices.

19. The method of claim 18 wherein the media packets are video packets and further comprising setting an adaptation field flag of no more than one byte within each re-packetized packet to indicate whether included media includes an I-frame, B-frame, and P-frame.

20. The method of claim 18 further comprising setting an adaptation field length within the re-packetized packets of no more than one byte to indicate a number of included stuffing bytes.

21. The method of claim 12 further comprising re-packetizing the plurality of packets according to MPEG-2.

22. The method of claim 21 further comprising identifying each unencrypted and encrypted media byte comprising the unencrypted and encrypted media slices with one or more data bytes included within each re-packetized packet according to MPEG-2 identifiers.

23. The method of claim 21 wherein the partially encrypted media packets are Advanced Video Coding (AVC) access units.

24. A computer-readable medium not including a signal and having stored thereon computer-executable instructions which when executed by a computer perform the method of claim 12.

25. A computer-readable medium not including a signal and having stored thereon computer-executable instructions which when executed by a computer perform a method for re-packetizing partially encrypted media packets, the method comprising:
   identifying encrypted media and unencrypted media slices included within each partially encrypted media packet, each of the partially encrypted media packets including both encrypted media slices and unencrypted media slices; and
   de-concatenating each identified encrypted and unencrypted media slice into separate packets comprised of one of encrypted and unencrypted media slices.

* * * * *